United States Patent
Zhu et al.

(10) Patent No.: US 11,075,998 B2
(45) Date of Patent: *Jul. 27, 2021

(54) ARCHITECTURE, METHOD AND APPARATUS FOR REALIZING COMMUNICATION BETWEEN NETWORK FUNCTIONS

(71) Applicant: ZTE CORPORATION, Guangdong (CN)

(72) Inventors: Jinguo Zhu, Shenzhen (CN); Se Wu, Shenzhen (CN); Qiang Yao, Shenzhen (CN); Weibin Wang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 247 days.

This patent is subject to a terminal disclaimer.

(21) Appl. No.: 16/089,302

(22) PCT Filed: Mar. 28, 2017

(86) PCT No.: PCT/CN2017/078449
§ 371 (c)(1),
(2) Date: Sep. 27, 2018

(87) PCT Pub. No.: WO2017/167185
PCT Pub. Date: Oct. 5, 2017

(65) Prior Publication Data
US 2020/0236178 A1 Jul. 23, 2020

(30) Foreign Application Priority Data
Apr. 1, 2016 (CN) .......................... 201610203606.4

(51) Int. Cl.
*H04L 29/08* (2006.01)
*H04L 12/24* (2006.01)
(Continued)

(52) U.S. Cl.
CPC ........ *H04L 67/141* (2013.01); *H04L 41/0893* (2013.01); *H04L 61/1511* (2013.01);
(Continued)

(58) Field of Classification Search
None
See application file for complete search history.

(56) References Cited

U.S. PATENT DOCUMENTS

| 9,094,420 B2 | 7/2015 | Matula et al. |
| 2010/0114943 A1* | 5/2010 | Fu ........................ H04L 47/745 707/769 |

(Continued)

FOREIGN PATENT DOCUMENTS

| CN | 101124834 A | 2/2008 |
| CN | 101400109 A | 4/2009 |

(Continued)

OTHER PUBLICATIONS

International Search Report for International Appl. No. PCT/CN2017/078449, dated Jun. 26, 2017.

(Continued)

*Primary Examiner* — Cai Y Chen
(74) *Attorney, Agent, or Firm* — Foley & Lardner LLP (57) ABSTRACT

Provided are an architecture, method and apparatus for realizing communication between network functions. The network function establishes interworking with other communication domains via the interface function. An interworking interface between a network function and a selected interface function is identical to an interworking interface between the network function and a destination network function. With the architecture, the network function and the interface function are decoupled. The interworking between network functions within the communication domain and the interworking between the network function within the (Continued)

communication domain and the network function outside the communication domain are achieved by using only one type of interworking interface.

10 Claims, 5 Drawing Sheets

(51) Int. Cl.
  *H04L 29/12* (2006.01)
  *H04W 92/16* (2009.01)
(52) U.S. Cl.
  CPC .......... *H04L 67/1002* (2013.01); *H04L 67/16* (2013.01); *H04W 92/16* (2013.01)

(56) References Cited

U.S. PATENT DOCUMENTS

2017/0164212 A1* 6/2017 Opsenica .............. H04W 24/02
2019/0097889 A1* 3/2019 Browne .............. H04L 41/0823

FOREIGN PATENT DOCUMENTS

| CN | 101448217 A | 6/2009 |
| CN | 102098799 A | 6/2011 |
| CN | 104980972 A | 10/2015 |
| EP | 1 953 963 A1 | 8/2008 |

OTHER PUBLICATIONS

Extended European Search Report for EP Appl. No. 17773215.3, dated Jan. 31, 2020.

Vilalta, Ricard et al: "Transport Network Function Virtualization", Journal of Lightwave Technology, vol. 33, No. 8, Apr. 15, 2015 (Apr. 15, 2015), pp. 1557-1564, XP055654117, USA, ISSN: 0733-8724, DOI: 10.1109/JLT.2015.2390655.

* cited by examiner

ARCHITECTURE, METHOD AND APPARATUS FOR REALIZING COMMUNICATION BETWEEN NETWORK FUNCTIONS

CROSS REFERENCE TO RELATED APPLICATIONS

This is a National Stage Application, filed under 35 U.S.C. 371, of International Patent Application No. PCT/CN2017/078449, filed on Mar. 28, 2017, which claims priority to Chinese Patent Application No. 201610203606.4 filed on Apr. 1, 2016, contents of both of which are incorporated herein by reference in their entireties.

TECHNICAL FIELD

Embodiments of the present disclosure relate to mobile communication technologies and, in particular, to an architecture, method and apparatus for realizing communication between network functions.

BACKGROUND

Traditional mobile communication is communication among people, and a system architecture thereof is used in all communication scenarios. However, this system architecture is not flexible enough. In the research on the next generation communication, new service scenarios such as communication between people and things as well as communication between things and things need to be supported. The new communication scenarios need different system architectures. That is, the traditional single system architecture can no longer meet the development demands of communication technologies.

Figure 1:
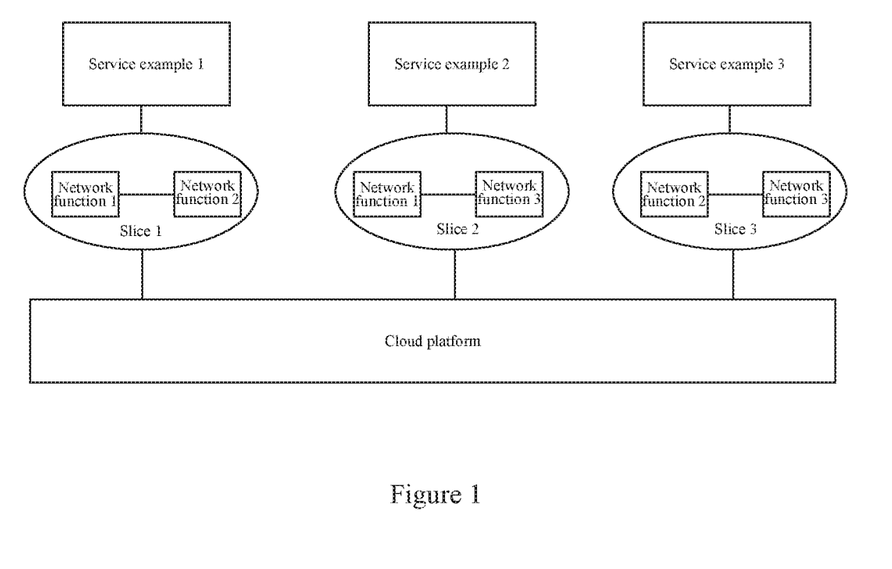
FIG. 1 is a schematic diagram illustrating the realization of network slices in the related art.

A network slice is an important technical means to support multiple logical networks on a physical network. The network slice is a set of a group of network functions. These network functions have specific behaviors and interwork with each other via interfaces so as to provide a communication service or network capability. FIG. 1 is a schematic diagram of the network slices in the related art. As shown in FIG. 1, three network slices are provided for respectively meeting three different service demands. All network slices are operated on a cloud platform. The network functions of the network slices may be different. The cloud platform is a hardware and software platform realized by a Network Function Virtualization (NFV) technology and a Software Define Network (SDN) technology, and can realize dynamic creation, maintenance and physical resource sharing of the logic function.

Two problems need to be solved in order to realize the network functions in the network slices.

One problem is that the communication mechanism between network elements in a traditional network generally adopts a static configuration link or a query mode of a relatively static Domain Name System (DNS), while the network functions operated on the cloud platform are virtualized network functions. Compared with traditional network elements, the creation and deletion of the network functions operated on the cloud platform are extremely frequent. Therefore, it is hard for the traditional static configuration and DNS to solve the communication problem between the virtualized network functions.

Another problem is that the network functions within the network slices need to interwork with the traditional network. Therefore, the network functions need to deal with complex interfaces of the traditional network, which makes the network functions become very complicate and difficult to be developed and deployed quickly.

SUMMARY

The following is a summary of the subject matter described in detail in the present disclosure. This summary is not intended to limit the scope of the claims.

In view of this, embodiments of the present disclosure provide an architecture, method and apparatus for realizing communication between network functions, capable of simplifying the design of network functions and greatly reducing the development and deployment difficulties of the network functions.

To achieve an object of the present disclosure, an architecture for realizing communication between network functions is provided in the embodiments of the present disclosure. The architecture, in each communication domain, at least includes one or more network functions, one or more interface functions and a function management module.

The network function is configured to handle its own information processing and perform information interactions with other network functions.

The interface function is configured to provide interworking with a different communication domain.

The function management module is configured to accept a registration from the interface function or the network function, and store information corresponding to the interface function or the network function initiating a registration request.

An interworking interface between a network function and a selected interface function is identical to an interworking interface between the network function and a destination network function.

Optionally, the interface function supports a traditional network interface, and is further configured to handle the interworking with a traditional network.

Optionally, each interface function supports one or more types of interworking interfaces.

Optionally, the interface functions in the same communication domain are deployed together, or are arranged independently.

A method for realizing communication between network functions is further provided in the embodiments of the present disclosure. The method includes: an interface function or a network function registering with a function management module after being instantiated, so that the function management module stores information corresponding to the interface function or the network function.

Network functions in the same communication domain directly interwork with each other to realize communication. The network function establishes communication with the network function in another communication domain via the interface function.

An interworking interface adopted between the network function and a selected interface function is the same as an interworking interface adopted between the network function and a destination network function.

Optionally, the interface function supports a traditional network interface. The method further includes steps described below.

The network function sets up communication with a traditional network element via the interface function.

Optionally, the interface functions in the same communication domain support one or more types of interworking interfaces.

Optionally, the step in which the network functions in the same communication domain directly interwork with each other to realize communication includes the steps described below.

The network function needs to establish a session, and initiates a function query request to the function management module for obtaining the destination network function in a communication domain to which the network function initiating a session establishment request belongs.

The network function initiating the session establishment sends the session establishment request to the obtained destination network function for establishing a session between the network function itself and the network function in the communication domain to which the network function itself belongs. Optionally, the step in which the network function establishes communication with the network function or a traditional network element in another communication domain via an interface function includes the steps described below.

The network function needs to establish a session and initiates a function query request to the function management module for obtaining address information of an interface function corresponding to the network function initiating the session establishment request.

The network function initiating session establishment sends the session establishment request to the obtained interface function corresponding to the network function itself.

The interface function corresponding to a current session determines, through querying a Domain Name System (DNS), that the destination network function is a network function outside the communication domain to which the interface function itself belongs, and sends the session establishment request to the network function outside the communication domain via the interface function corresponding to the network function outside the communication domain for establishing a session between the interface function itself and the network function outside the communication domain. Alternatively, the interface function corresponding to the current session determines, through querying the DNS, that the destination network function is a traditional network element outside the communication domain to which the interface function belongs, and directly sends the session establishment request to the traditional network element for establishing a session between the interface function itself and the traditional network element outside the communication domain.

An apparatus for realizing communication between network functions is further provided in the embodiments of the present disclosure. The apparatus includes a first registration module and a first processing module.

The first registration module is configured to request a function management module to register own information of the first registration module itself so that the function management module saves the information of the first registration module.

The first processing module is configured to look up, according to a received session establishment request from a network function and through a Domain Name System (DNS), a destination interface function or a destination traditional network element, and send the session establishment request to a corresponding destination network function via the found destination interface function or directly send the session establishment request to the found destination traditional network element, and select a suitable network function by querying the function management module when receiving the session establishment request from an interface function or a traditional network element outside the communication domain to which the apparatus belongs, and send the session establishment request to the selected network function.

Optionally, the first registration module is further configured to receive a registration response from the function management module.

Optionally, the first processing module is further configured to realize a load sharing of a plurality of network functions according to load of the plurality of network functions when selecting the suitable network function.

Optionally, the apparatus is disposed in the interface function.

An apparatus for realizing communication between network functions is further provided in the embodiments of the present disclosure. The apparatus includes a second registration module and a second processing module.

The second registration module is configured to request a function management module for registering information of the second registration module itself so that the function management module stores the information of the second registration module itself.

The second processing module is configured to initiate a function query request to the function management module for obtaining a destination network function or an interface function related to a device in which the apparatus is located when the apparatus needs to establish a session; send a session establishment request to the obtained destination network function or the interface function related to the device in which the apparatus locates for establishing communication between the apparatus itself and the network function in the communication domain to which the apparatus itself belongs, or establishing communication between the apparatus itself and a network function or a traditional network element outside the communication domain to which the apparatus itself belongs.

Optionally, the second processing module is further configured to receive a session establishment response from the network function in the communication domain to which the apparatus itself belongs, or from the interface function bound to the apparatus itself in the communication domain to which the apparatus itself belongs.

Optionally, the apparatus is disposed in the network function.

An apparatus for realizing communication between network functions is further provided in the embodiments of the present disclosure. The apparatus includes a third registration module, a third processing module and a storage module.

The second registration module is configured to receive a registration request from an interface function or a network function, and store information corresponding to the interface function or the network function initiating the registration request.

The third processing module is configured to receive a function query request from the network function, look up a destination network function or an interface function related to the network function initiating the function query request in the storage module, and return the destination network function or the interface function related to the network function initiating the function query request to the network function initiating the function query request.

The storage module is configured to store information corresponding to the interface function or the network function initiating the registration request.

Optionally, the third registration module is further configured to return a registration response to the interface function or the network function initiating the registration request.

Optionally, the apparatus is disposed in an interface function management module.

A computer-readable storage medium is further provided in the embodiments of the present disclosure, which is configured to store computer-executable instructions for executing any method for realizing communication between network functions described above.

Compared with the related art, the present disclosure includes: an interface function or a network function registering with a function management module after being instantiated, so that the function management module stores information corresponding to the interface function or the network function. Network functions in a same communication domain directly interwork with each other to realize communication. The network function establishes communication with a network function in another communication domain via the interface function. An interworking interface between the network function and a selected interface function is identical to an interworking interface between the network function and a destination network function. The architecture for realizing network function communication provided by the present disclosure realizes the decoupling of the network function and the interface function. The network function can realize the interworking with the network functions inside the communication domain as well as the interworking with the network functions outside the communication domain by using only one type of interworking interface, so that the logic of the network functions becomes simple, thereby simplifying the design of the network functions and greatly reducing the development and deployment difficulties of the network functions.

Other aspects can be understood after the drawings and detailed description are read and understood.

BRIEF DESCRIPTION OF DRAWINGS

The drawings described herein are used to provide a further understanding of the present disclosure, and form a part of the present disclosure. The exemplary embodiments and descriptions thereof in the present disclosure are used to explain the present disclosure and do not limit the present disclosure in any improper way. In the drawings.

DETAILED DESCRIPTION

The present disclosure will be described in detail with reference to the drawings in conjunction with embodiments. It is to be noted that if not in collision, the embodiments and features thereof in the present disclosure may be combined with each other.

Figure 2:
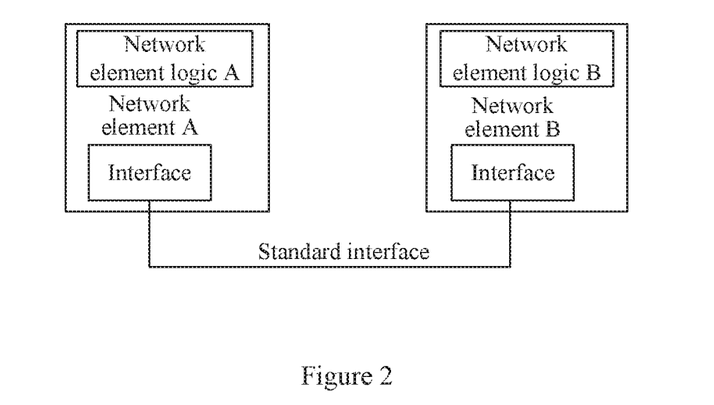
FIG. 2 is a schematic diagram of an architecture for communication between network elements in the related art.

FIG. 2 is a schematic diagram of an architecture for communication between network elements in the related art. As shown in FIG. 2, a network element in the related art includes a network element logic section inside the network and an interface section. Therefore, to realize the communication between two network elements, at first, an interface between the two network elements needs to be standardized. That is, the two network elements need to realize a standard interface to interwork with each other. Next, the interface and the network logic are combined together, which means that when upgrading the network element logic function, the whole network element cannot communicate with other network elements in a short time and cannot provide services for users. Moreover, the network element logic needs to be tightly coupled to the interface. However, the processing of traditional interfaces is a very complex part in a communication process. When a protocol version supported by a communication partner is different from the protocol version supported by the network element itself, the network element logic becomes extremely complicate, which undoubtedly increases the development and deployment difficulties of the network elements.

Figure 3:
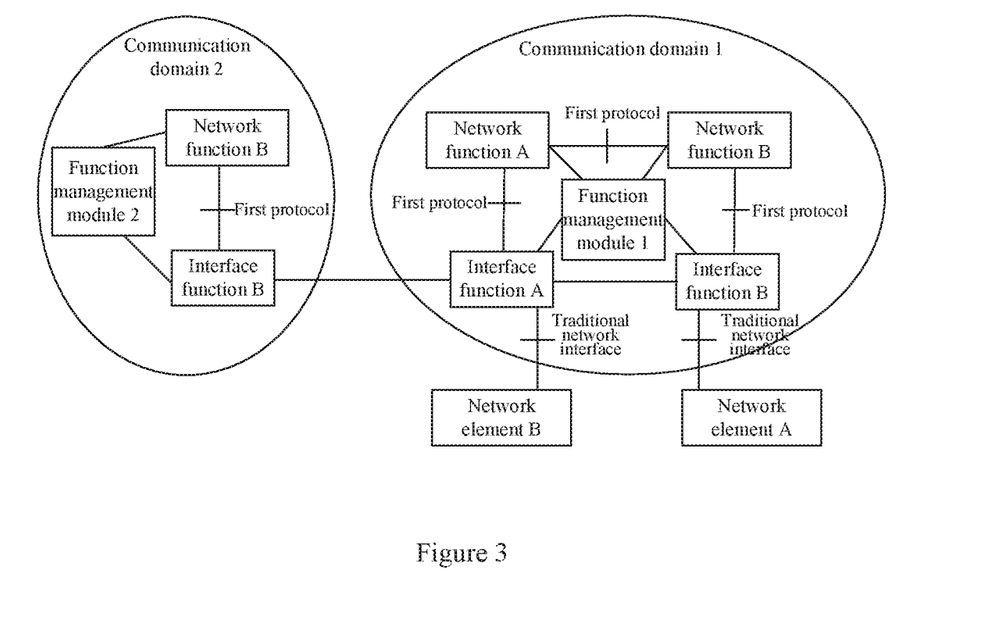
FIG. 3 is a schematic diagram of an architecture for realizing communication between network functions according to an embodiment of the present disclosure.

FIG. 3 is a schematic diagram of an architecture for realizing communication between network functions according to an embodiment of the present disclosure. As shown in FIG. 3, the concept of a communication domain is defined in the present embodiment. For example, each communication domain is constituted in one data center. Network functions and interface functions in one communication domain use the same address encoding and addressing mode, thereby may directly communicate with each other. In each communication domain, the architecture at least includes one or more network functions, one or more interface functions and a function management module.

The network function is configured to handle its own information processing and perform information interactions with other network functions.

The network functions in each communication domain may directly interwork with each other without a protocol conversion of the interface functions. The network functions in the communication domain may be network functions from one manufacturer or different manufacturers. Since the network functions do not need to pay attention to interfaces supported by other network functions, the design of the network functions is simplified.

The interface function is configured to provide interworking with different communication domains. Optionally, the interface function is used for supporting a traditional network interface to process the interworking with a traditional network.

Specifically, an interworking interface adopted between an interface function and a network function is a communication protocol, and is the same as interworking interfaces between different network functions in the communication domain. As shown in FIG. 3, in a communication domain 1, a first protocol is adopted between an interface function A and a network function A, and between an interface function B and a network function B. And, the first protocol is exactly the communication protocol between the network function A and the network function B in the communication domain 1. The first protocol is also adopted between the network function A and a network function B in a communication domain 2. In this way, using the network function A in the communication domain 1 as an example, from perspective of the network function A, the communication between the network function A and the network function B in the communication domain 1 may be completed by supporting only one communication protocol, such as the first protocol, and the interworking between the network function A and the network function B in the communication domain 2 may be realized via interface functions in different interface domains with the same interface protocol, which simplifies the design of the network function A. Optionally, if the interface function supports the traditional network interface, then the network function A in the communication domain 1 also only needs to support one communication protocol, such as the first protocol, to complete the communication with a traditional network element, such as a network element B, which also simplifies the design of the network function A.

One communication domain may include one or more interface functions. Each interface function may support one type of interworking interface or multiple types of interworking interfaces. The interface function needs to register external address information and a supported interface function type within a Domain Name System (DNS). In this way, the traditional network may look up the interface function through the DNS. Also, the interface function and the network function are integrated together, which equals to a traditional network element supporting the network function.

It can be seen that the interface function and the network function may be decoupled in the embodiments of the present disclosure, which is different from the related art shown in FIG. 2, in which the network element logic needs to be tightly coupled to the interface, so that the logic of the network functions becomes simple, greatly reducing the development and deployment difficulties of the network functions.

The function management module is configured to accept the registration of the interface function or the network function after the interface function or the network function is instantiated (that is, the network function or the interface function is actually deployed into the network), store information corresponding to the interface function or the network function initiating a registration request. The information includes the types of the interface function such as a S1 interface, S6a interface and address information, etc. In this way, other network functions may realize the discovery of a certain interface function or a certain network function by the function management module.

The interface functions in the same communication domain are deployed together, or are arranged independently and separately.

With the architecture for realizing communication between network functions provided by the embodiments of the present disclosure, the network function and the interface function are decoupled. The network functions realize the interworking with the network functions inside the communication domain as well as the interworking with the network functions outside the communication domain by using only one type of interworking interface, so that the logic of the network functions becomes simple, thereby simplifying the design of the network functions and greatly reducing the development and deployment difficulties of the network functions.

Based on the architecture shown in FIG. 3, the method for realizing communication between network functions in the embodiments of the present disclosure includes: the interface function or the network function registering with the function management module after the interface function or the network function is instantiated, so that the function management module saves information corresponding to the interface function or the network function.

Network functions in a same communication domain directly interwork with each other to realize communication. The network function establishes communication with the network function in other communication domains via the interface function.

An interworking interface adopted between the network function and a selected interface function is the same as the interworking interface adopted between the network function and a destination network function.

The interface functions in the same communication domain may support one or more types of interworking interfaces.

Optionally, if the interface function supports the traditional network interface, the method further includes that the network function establishes communication with a traditional network element via the interface function.

The process that interface functions in the same communication domain directly interwork with each other to realize communication includes steps described below.

The network function needs to establish a session and initiates a function query request to the function management module for obtaining the destination network function in the communication domain to which the network function initiating a session establishment request belongs.

The network function initiating the session establishment sends the session establishment request to the obtained destination network function for establishing a session between the network function itself and the network function in the communication domain to which the network function itself belongs.

In this way, the communication between the network functions in the same communication domain is realized.

The process that the network function establishes communication with the network function or the traditional network element in another communication domain via the interface function includes the steps described below.

The network function needs to establishes a session and initiates a function query request to the function management module for obtaining address information of the interface function corresponding to the network function initiating the session establishment request.

The network function initiating the session establishment sends the session establishment request to the obtained interface function corresponding to the network function itself.

The interface function corresponding to a current session determines, by querying the DNS, that the destination network function is a network function outside the communication domain to which the interface function belongs, sends, via the interface function corresponding to the network function outside the communication domain, the session establishment request to the network function outside the communication domain for establishing a session between the interface function itself and the network function outside the communication domain. Alternatively, the interface function corresponding to the current session determines, by querying the DNS, that the destination network function is a traditional network element outside the communication domain to which the interface function belongs, and directly sends the session establishment request to the traditional network element for establishing a session between the interface function itself and the traditional network element outside the communication domain.

In this way, the communication between the network functions in different communication domains, or the communication between the network function and the traditional network element is realized.

The method in the embodiments of the present disclosure will be described below in detail in conjunction with examples.

Figure 4:
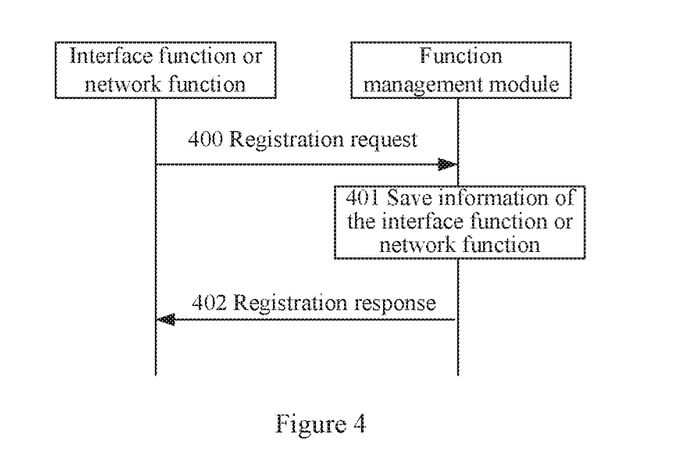
FIG. 4 is a flowchart of realizing an interface function registration according to an embodiment of the present disclosure.

FIG. 4 is a flowchart of realizing the registration of an interface function or a network function according to an embodiment of the present disclosure. As shown in FIG. 4, the process of realizing the registration of an interface function or a network function after the interface function or the network function is instantiated includes the following steps.

In step 400, the interface function or the network function sends a registration request to a function management module to realize registration.

The address of the function management module may be statically configured or obtained by querying a DNS.

In this step, a registration request message carries an indication of an interface function or network function initiating the registration request, an interface function type supported by the interface function initiating the registration request or a network function type supported by the network function initiating the registration request, a processing capability and a routable address identifier in at least one communication domain of the interface function or network function initiating the registration request, etc.

In step 401, the function management module stores information corresponding to the interface function or the network function initiating the registration request, that is, the information carried in the registration request.

In step 402, the function management module returns a registration response to the interface function or the network function initiating the registration request.

Figure 5:
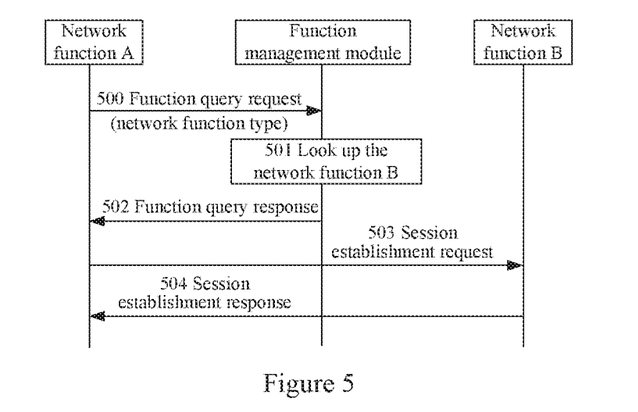
FIG. 5 is a flowchart of realizing communication between network functions in the same communication domain according to an embodiment of the present disclosure.

FIG. 5 is a flowchart of realizing communication between network functions in the same communication domain according to an embodiment of the present disclosure. This embodiment uses communication between a network function A and a network function B in a communication domain 1 as an example in conjunction with FIG. 3. As shown in FIG. 5, the process for realizing communication between network functions in the same communication domain includes the following steps.

In step 500, the network function A initiates a function query request to a function management module. The function query request carries a network function type which the network function A requires.

The address of the function management module may be statically configured or obtained by querying the DNS.

In steps 501 and 502, the function management module looks up, according to the network function type of the request query, an available network function, such as the network function B, and returns the network function to the network function A that initiates the function query request, that is, returns the routable address identifier of the network function B in the communication domain to which the network function B belongs, to the network function A.

It is to be noted that if there are two or more available network functions, one available network function may be selected randomly from the two or more available network functions, or may be selected according to the processing capabilities of the network functions to realize a load sharing. The specific realization described here is merely an example, and is not intended to limit the protection scope of the present disclosure.

In step 503, the network function A sends a session establishment request to the network function B. The session establishment request carries relevant information of requesting the session establishment, such as a user identifier and a requested Access Point Name (APN).

In step 504, after establishing the session, the network function B returns a session establishment response to the network function A.

Figure 6:
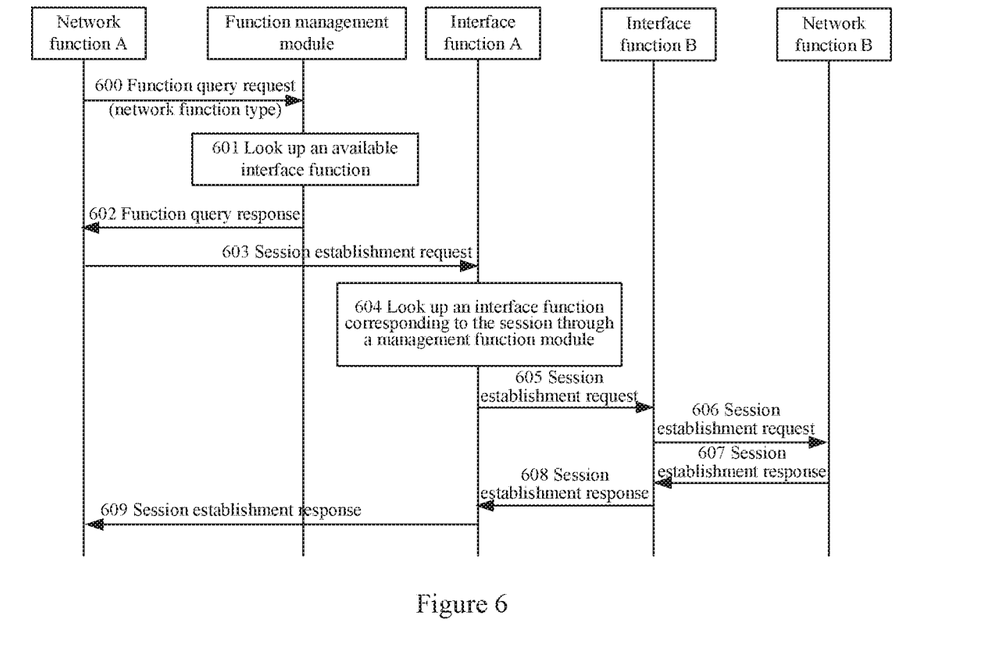
FIG. 6 is a flowchart of realizing communication between network functions in different communication domains according to an embodiment of the present disclosure.

FIG. 6 is a flowchart of realizing communication between network functions in different communication domains according to an embodiment of the present disclosure. This embodiment uses communication between a network function A in a communication domain 1 and a network function B in a communication domain 2 as an example in conjunction with FIG. 3. As shown in FIG. 6, the process of realizing communication between network functions in different communication domains includes the following steps.

In step 600, the network function A initiates a function query request to a function management module. The function query request carries a network function type for which the network function A requests for querying.

The address of the function management module may be statically configured or obtained by querying a DNS.

In steps 601 and 602, the function management module determines, according to the network function type for which the function query request is initiated, that no suitable network function is in the communication domain to which the network function A belongs, then finds an available interface function related to the network function initiating the function query request, such as an interface function A, and returns a function query response to the network function A initiating the function query request, where the function query response carries the interface function A's routable address identifier in the communication domain to which the interface function A belongs.

In this way, the network function A is bound to the interface network A.

In step 603, the network function A sends a session establishment request to the interface function A. The session establishment request carries relevant information of requesting the session establishment, such as a user identifier and a requested Access Point Name (APN).

In step 604, the interface function A determines an interface function B in the communication domain 2 corresponding to a destination network function by querying the DNS.

For example, if the network function A is a mobility management function entity, the network function B is a serving gateway. The network function A sends the session establishment request to the interface function A that is bound to the network function A in the steps 601 and 602, and then the interface function A learns, according to the APN carried in the received session establishment request and through querying the DNS, address information of an interface function B in another communication domain corresponding to the serving gateway, that is, the network function B, and protocol information for communicating with the interface function B.

In step 605, the interface function A forwards the session establishment request to the interface function B.

If the interface function B supports a protocol related to the interface function A, the interface function B does not need to perform a protocol conversion on the session establishment request, and the interface function A directly forwards the received session establishment request to the interface function B. If a protocol supported by the interface function B is different form the protocol supported by the interface function A, the interface function A needs to perform the protocol conversion on the session establishment request, and then forwards the converted session establishment request to the interface function B.

In step 606, if the interface function B needs to perform the protocol conversion, the received session establishment request is converted into information of the communication domain to which the interface function B belongs. The interface function B selects a suitable network function B by querying an interface function management module, and sends the session establishment request to the network function B.

Similarly, in this step, two or more network functions B may be bound to the interface function B. Therefore, the suitable network function B needs to be selected according to the processing capability or selected randomly.

Optionally, when the interface function B selects the network function B, information about the processing capability may also be considered to realize a load sharing of multiple network functions B.

In step 607, after establishing the session, the network function B returns the session information response to the interface function B.

In step 608, the interface function B sends the session establishment response to the interface function A.

In step 609, the interface function A returns the session establishment response to the network function A.

In this way, the network function A, the interface function A, the interface function B and the network function B all set up relevant session information.

The steps 606 and 607 are also applicable to the scenario that the interface function B receives the session establishment request from a traditional network element. In this case, the interface function B obtains, according to information from the traditional interface, a required network function type. The interface function needs to query the function management module to obtain a destination network function. After that, the interface function performs the protocol conversion, and sends the session establishment request to the selected network function.

Figure 7:
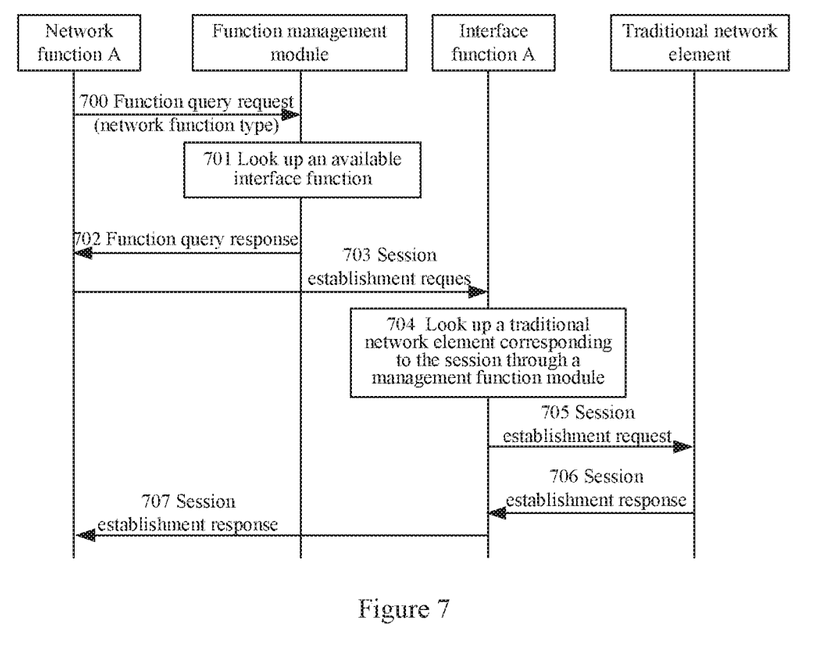
FIG. 7 is a flowchart of realizing communication between a network function and a traditional network element according to an embodiment of the present disclosure.

FIG. 7 is a flowchart of realizing communication between a network function and a traditional network element according to an embodiment of the present disclosure. This embodiment uses communication between the network function A in a communication domain 1 and the traditional network element outside the communication domain 1, such as the network element B as an example in conjunction with FIG. 3. As shown in FIG. 7, the process of realizing communication between a network function and a traditional network element includes the following steps.

In step 700, the network function A initiates a function query request to a function management module. The function query request carries a network function type for which the network function A queries.

The address of the function management module may be statically configured or obtained by searching a DNS.

In steps 701 and 702, the function management module determines, according to the network function type of the request query, that no suitable network function is in the communication domain to which the network function A belongs, then looks up an available interface function (for example, an interface function A) corresponding to the network function, and returns a function query response to the network function A initiating the function query request, where the function query response carries the interface function A's routable address identifier in the communication domain to which the interface function A belongs.

In this way, the network function A is bound to the interface network A.

In step 703, the network function A sends a session establishment request to the interface function A. The session establishment request carries relevant information of requesting the session establishment, such as a user identifier and a requested Access Point Name (APN).

In step 704, the interface function A learns address of a destination traditional network element B by querying the DNS.

For example, if the network function A is a mobility management function entity and the traditional network element is a serving gateway, the network function A sends the session establishment request to the interface function A which is bound to the network function A in the steps 701 and 702, and then the interface function A queries the DNS according to the APN carried in the received session establishment request to know the address information in another communication domain corresponding to the serving gateway, that is, the traditional network element, such as traditional network element B.

In step 705, the interface function A needs to perform a protocol conversion, and forwards, via the traditional interface, the session establishment request to the traditional network element, such as the traditional network element B.

In step 706, after performing a session processing, the traditional network element, such as the traditional network element B, returns a session establishment response to the interface function A.

In step 707, the interface function A returns the session establishment response to the network function A.

In this way, the network function A, the interface function A, the traditional network element B all set up relevant session information.

It is to be noted that the session establishment request in the embodiment shown in FIG. 7 may also be initiated by the traditional network element. The specific realization is similar to the process shown in FIG. 7, and is easy for those skilled in the art on the basis of the embodiment in FIG. 7 of the present disclosure, and will not be repeated here.

Embodiments of the present disclosure further provide a computer-readable storage medium, which is configured to store computer-executable instructions for executing any above-mentioned method for realizing communication between network functions.

Figure 8:
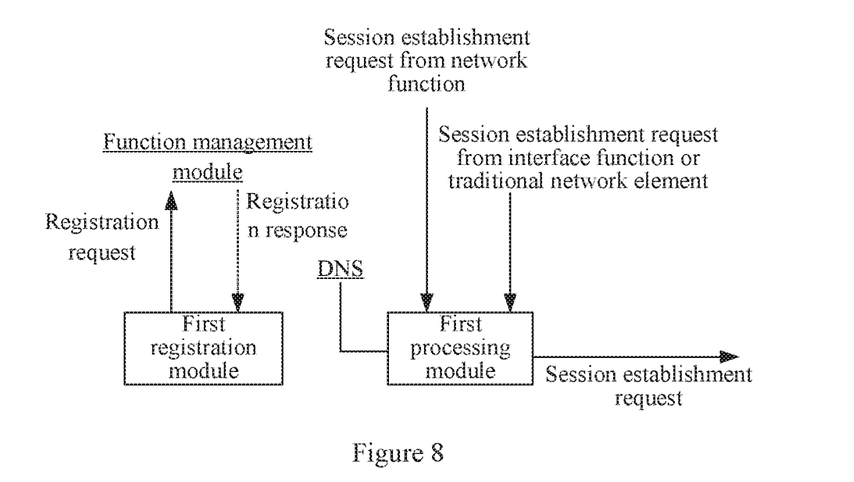
FIG. 8 is a structural diagram of an apparatus for realizing communication between network functions according to an embodiment of the present disclosure.

FIG. 8 is a structural diagram of an apparatus for realizing communication between network functions according to an embodiment of the present disclosure. As shown in FIG. 8, the apparatus at least includes a first registration module and a first processing module.

The first registration module is configured to request a function management module for registering information of the first registration module so that the function management module stores the information of the first registration module.

The first processing module is configured to: look up, according to a received session establishment request from a network function and through a Domain Name System (DNS), a destination interface function or a destination traditional network element, and send the session establishment request to a corresponding destination network function via the found destination interface function or directly send the session establishment request to the found destination traditional network element; and select a suitable network function by querying the function management module when receiving the session establishment request from an interface function or a traditional network element outside the communication domain to which the apparatus belongs, and send the session establishment request to the selected network function.

Optionally, the first registration module is further configured to receive a registration response from the function management module.

Optionally, the first processing module is further configured to realize a load sharing of multiple network functions by taking the processing capability of the network function into account when selecting the suitable network function.

The apparatus shown in FIG. 8 may be disposed in the interface function.

Figure 9:
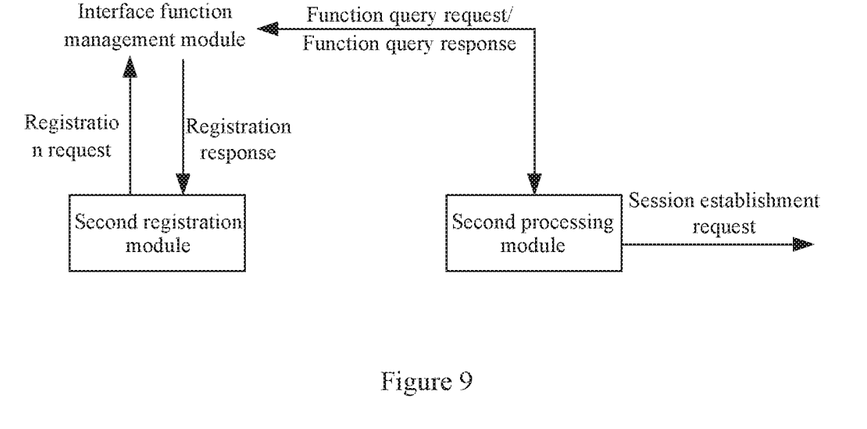
FIG. 9 is a structural diagram of another apparatus for realizing communication between network functions according to an embodiment of the present disclosure.

FIG. 9 is a structural diagram of another apparatus for realizing communication between network functions according to an embodiment of the present disclosure. As shown in FIG. 9, the apparatus at least includes a second registration module and a second processing module.

The second registration module is configured to request a function management module for registering information of the second registration module itself so that the function management module stores the information of the second registration module itself.

The second processing module is configured to initiate a function query request to the function management module for obtaining a destination network function or an interface function related to a device in which the apparatus is located when the apparatus needs to establish a session; send a session establishment request to the obtained destination network function or the interface function related to the device in which the apparatus locates for establishing communication between the apparatus itself and the network function in the communication domain to which the apparatus itself belongs, or establishing communication between the apparatus itself and a network function or a traditional network element outside the communication domain to which the apparatus itself belongs.

Optionally, the second processing module is further configured to receive a session establishment response from the network function in the communication domain to which the apparatus itself belongs, or from the interface function bound to the apparatus itself in the communication domain to which the apparatus itself belongs.

The apparatus shown in FIG. 9 may be disposed in the network function.

Figure 10:
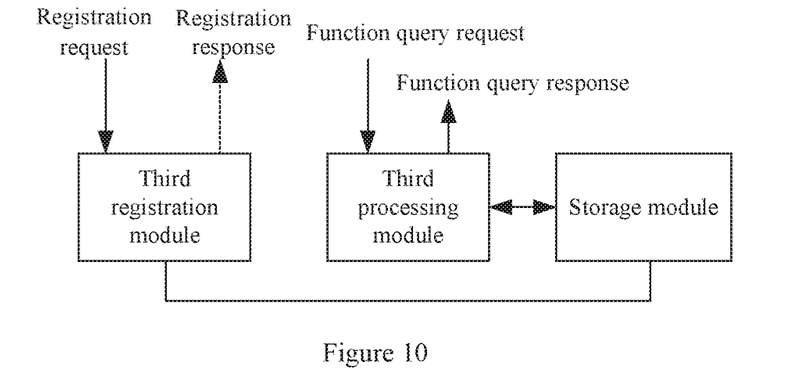
FIG. 10 is a structural diagram of a third apparatus for realizing communication between network functions according to an embodiment of the present disclosure.

FIG. 10 is a structural diagram of a third apparatus for realizing communication between network functions according to an embodiment of the present disclosure. As shown in FIG. 10, the apparatus at least includes a third registration module, a third processing module and a storage module.

The third registration module is configured to receive a registration request from an interface function or a network function, and store information corresponding to the interface function or the network function initiating the registration request.

The third processing module is configured to receive a function query request from the network function, look up a destination network function or an interface function related to the network function initiating the function query request in the storage module, and return the destination network function or the interface function related to the network function initiating the function query request to the network function initiating the function query request.

The storage module is configured to store information corresponding to the interface function or the network function initiating the registration request.

Optionally, the third registration module is further configured to return a registration response to the interface function or the network function initiating the registration request.

The apparatus shown in FIG. 10 may be disposed in an interface function management module.

The above are only preferred embodiments of the present disclosure and are not intended to limit the scope of the present disclosure. Any modifications, equivalent substitutions, improvements and the like made within the spirit and principle of the present disclosure are within the scope of the present disclosure.

It is understandable by those skilled in the art that all or some steps in the method described above may be completed by relevant hardware (such as a processor) as instructed by programs, and the programs may be stored in a computer-readable storage medium, such as a read-only memory, a magnetic disk and an optical disk. Optionally, all or part of the steps in the embodiments described above may also be implemented by using one or more integrated circuits. Accordingly, each module/unit in the embodiments described above may be implemented by hardware, for example, the functions of these modules/units may be implemented by integrated circuits; or may be implemented by software function modules, for example, the functions of these modules/units may be implemented by using a processor to execute programs/instructions stored in a storage medium. The present disclosure is not limited to any specific combination of hardware and software.".

Although the embodiments disclosed by the present disclosure are as described above, the content thereof is merely embodiments for facilitating the understanding of the present disclosure and is not intended to limit the present disclosure. Any person skilled in the art to which the present disclosure pertains may make any modifications and changes in the forms and details of the implementation without departing from the spirit and range disclosed by the present disclosure, but the patent protection scope of the present disclosure is still subject to the scope defined by the appended claims.

INDUSTRIAL APPLICABILITY

An architecture, method and apparatus for realizing communication between network functions provided by embodiments of the present disclosure, including: an interface function or a network function registering with a function management module after being instantiated, so that the function management module stores information corresponding to the interface function or the network function. Network functions in the same communication domain directly interwork with each other to realize communication. The network function sets up interworking with other communication domains via the interface function. An interworking interface adopted between the network function and the interface function is the same as the interworking interface adopted between the network function and a destination network function. With the architecture for realizing network function communication provided by the embodiments of the present disclosure, the network function and the interface function are decoupled. The interworking between the network functions within the same communication domain as well as the interworking between the network function within the communication domain and the network function outside the communication domain are achieved with only one type of interworking interface, so that the logic of the network functions becomes simple, thereby simplifying the design of the network functions and greatly reducing the development and deployment difficulties of the network functions.

What is claimed is:

1. A method for realizing communication between network functions, comprising:
  an interface function or a network function registering with a function management module after being instantiated, so that the function management module stores information corresponding to the interface function or the network function;
  directly interworking with each other, by network functions in a same communication domain, to realize communication; and
  establishing, by the network function, communication with a network function in another communication domain via the interface function,
  wherein an interworking interface between the network function and a selected interface function is identical to an interworking interface between the network function and a destination network function.

2. The method according to claim 1, wherein the interface function supports a traditional network interface, the method further comprises: establishing, by the network function, communication with a traditional network element via the interface function.

3. The method according to claim 1, wherein directly interworking with each other, by the network functions in a same communication domain, to realize the communication comprises:
  the network function needing to establish a session, initiating a function query request to the function management module for obtaining the destination network function in a communication domain to which the network function initiating a session establishment request belongs; and
  sending, by the network function initiating session establishment, the session establishment request to the obtained destination network function for establishing a session between the network function itself and the network function in the communication domain to which the network function itself belongs.

4. The method according to claim 1, wherein establishing, by the network function, the communication with the traditional network element or the network function in another communication domain via the interface function comprises:
  the network function needing to establish a session and initiating a function query request to the function management module for obtaining address information of an interface function corresponding to the network function initiating a session establishment request;
  sending, by the network function initiating session establishment, the session establishment request, to the obtained interface function corresponding to the network function itself; and
  through querying a Domain Name System (DNS), determining, by the interface function corresponding to a current session, that the destination network function is a network function outside a communication domain to which the interface function itself belongs, and sending the session establishment request to the network function outside the communication domain via an interface function corresponding to the network function outside the communication domain for establishing a session between the interface function itself and the network function outside the communication domain; or, through querying the DNS, determining, by the interface function corresponding to the current session, that the destination network function is a traditional network element outside a communication domain to which the interface function belongs, and directly sending the session establishment request to the traditional network element for establishing a session between the interface function itself and the traditional network element outside the communication domain.

5. A non-transitory computer-readable storage medium storing computer-executable instructions, wherein the computer-executable instructions are used for executing a method for realizing communication between network functions,
wherein the method comprises:
  an interface function or a network function registering with a function management module after being instantiated, so that the function management module stores information corresponding to the interface function or the network function;
  directly interworking with each other, by network functions in a same communication domain, to realize communication; and
  establishing, by the network function, communication with a network function in another communication domain via the interface function,
  wherein an interworking interface between the network function and a selected interface function is identical to an interworking interface between the network function and a destination network function.

6. The non-transitory computer-readable storage medium according to claim 5, wherein the interface function supports a traditional network interface, and the method further comprises: establishing, by the network function, communication with a traditional network element via the interface function.

7. The non-transitory computer-readable storage medium according to claim 5, wherein directly interworking with each other, by the network functions in a same communication domain, to realize the communication comprises:
  the network function needing to establish a session, initiating a function query request to the function management module for obtaining the destination network function in a communication domain to which the network function initiating a session establishment request belongs; and
  sending, by the network function initiating session establishment, the session establishment request to the obtained destination network function for establishing a session between the network function itself and the network function in the communication domain to which the network function itself belongs.

8. The non-transitory computer-readable storage medium according to claim 5, wherein establishing, by the network function, the communication with the traditional network element or the network function in another communication domain via the interface function comprises:
- the network function needing to establish a session and initiating a function query request to the function management module for obtaining address information of an interface function corresponding to the network function initiating a session establishment request;
- sending, by the network function initiating session establishment, the session establishment request, to the obtained interface function corresponding to the network function itself; and
- through querying a DNS, determining, by the interface function corresponding to a current session, that the destination network function is a network function outside a communication domain to which the interface function itself belongs, and sending the session establishment request to the network function outside the communication domain via an interface function corresponding to the network function outside the communication domain for establishing a session between the interface function itself and the network function outside the communication domain; or, through querying the DNS, determining, by the interface function corresponding to the current session, that the destination network function is a traditional network element outside a communication domain to which the interface function belongs, and directly sending the session establishment request to the traditional network element for establishing a session between the interface function itself and the traditional network element outside the communication domain.

9. The non-transitory computer-readable storage medium according to claim 6, wherein establishing, by the network function, the communication with the traditional network element or the network function in another communication domain via the interface function comprises:
- the network function needing to establish a session and initiating a function query request to the function management module for obtaining address information of an interface function corresponding to the network function initiating a session establishment request;
- sending, by the network function initiating session establishment, the session establishment request, to the obtained interface function corresponding to the network function itself; and
- through querying a DNS, determining, by the interface function corresponding to a current session, that the destination network function is a network function outside a communication domain to which the interface function itself belongs, and sending the session establishment request to the network function outside the communication domain via an interface function corresponding to the network function outside the communication domain for establishing a session between the interface function itself and the network function outside the communication domain; or, through querying the DNS, determining, by the interface function corresponding to the current session, that the destination network function is a traditional network element outside a communication domain to which the interface function belongs, and directly sending the session establishment request to the traditional network element for establishing a session between the interface function itself and the traditional network element outside the communication domain.

10. The method according to claim 2, wherein establishing, by the network function, the communication with the traditional network element or the network function in another communication domain via the interface function comprises:
- the network function needing to establish a session and initiating a function query request to the function management module for obtaining address information of an interface function corresponding to the network function initiating a session establishment request;
- sending, by the network function initiating session establishment, the session establishment request, to the obtained interface function corresponding to the network function itself; and
- through querying a DNS, determining, by the interface function corresponding to a current session, that the destination network function is a network function outside a communication domain to which the interface function itself belongs, and sending the session establishment request to the network function outside the communication domain via an interface function corresponding to the network function outside the communication domain for establishing a session between the interface function itself and the network function outside the communication domain; or, through querying the DNS, determining, by the interface function corresponding to the current session, that the destination network function is a traditional network element outside a communication domain to which the interface function belongs, and directly sending the session establishment request to the traditional network element for establishing a session between the interface function itself and the traditional network element outside the communication domain.

* * * * *